J. J. SHAFER.
SPEEDOMETER.
APPLICATION FILED MAY 25, 1916.
1,196,162.
Patented Aug. 29, 1916.
3 SHEETS—SHEET 1.
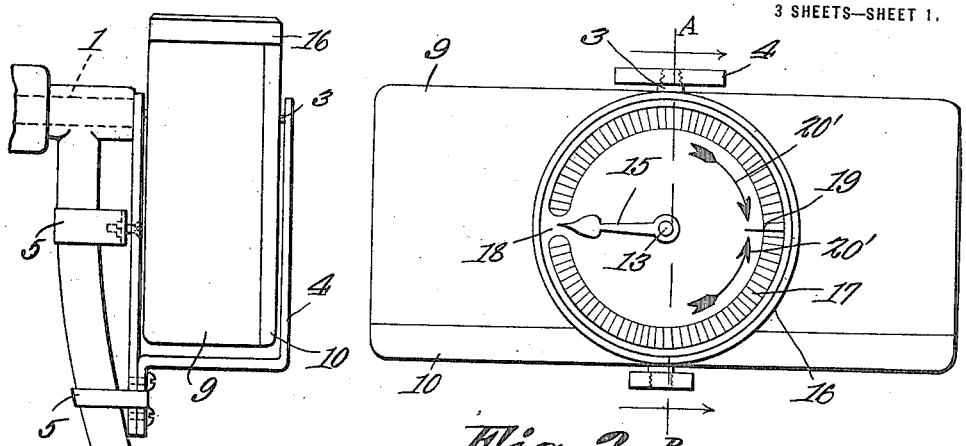
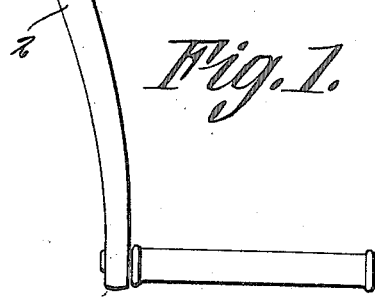
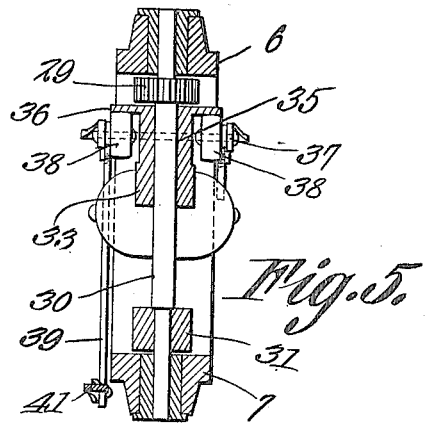
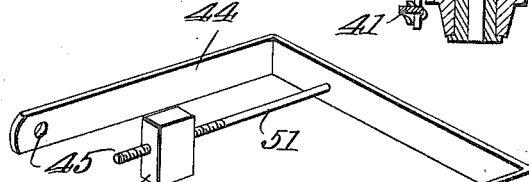
Witnesses
John J. Shafer
Inventor,
by C. A. Snow & Co.
Attorneys.

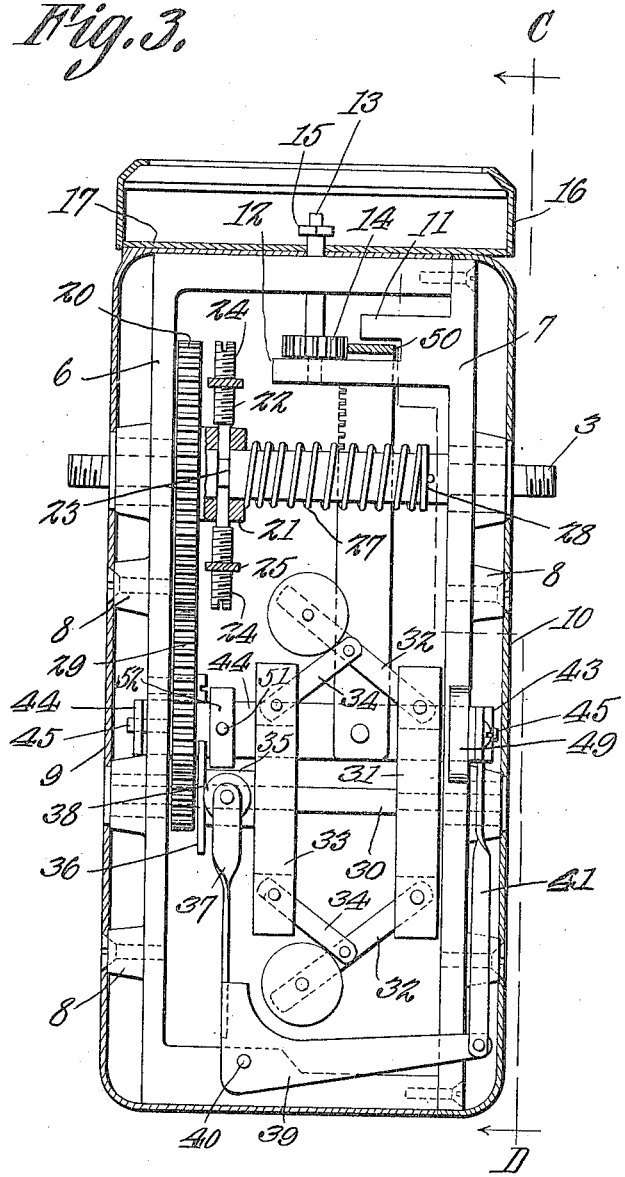

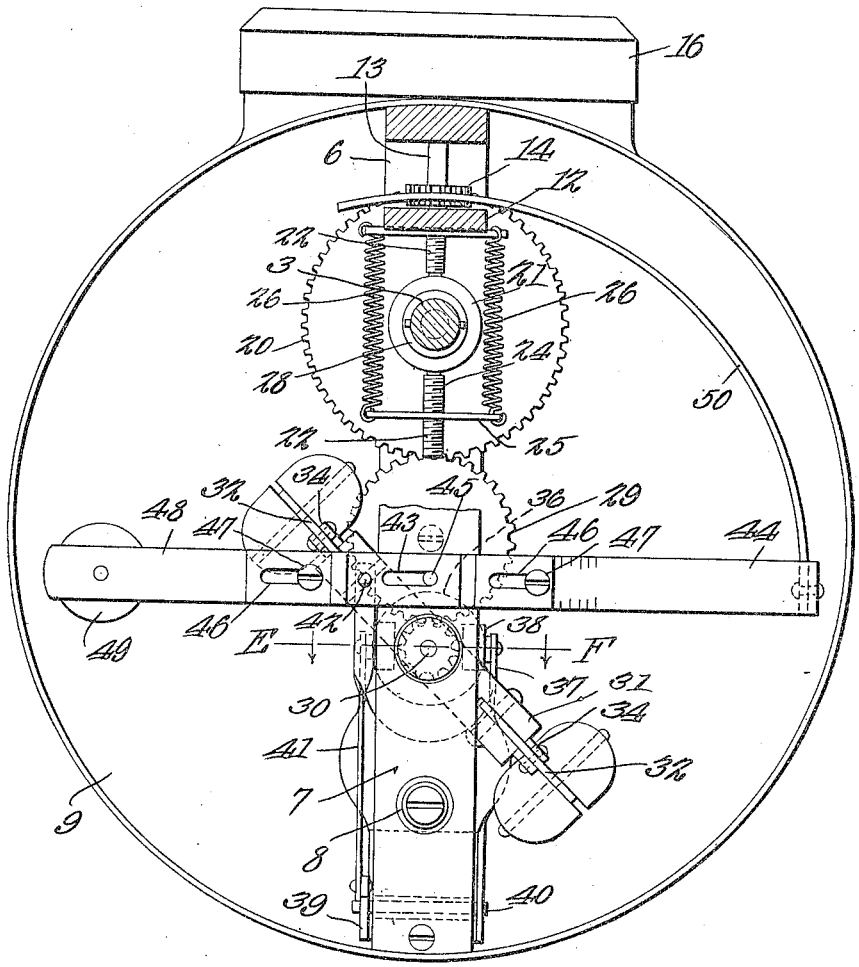

UNITED STATES PATENT OFFICE.

JOHN J. SHAFER, OF MAYVILLE, MICHIGAN.

SPEEDOMETER.

1,196,162.  Specification of Letters Patent.  Patented Aug. 29, 1916.

Application filed May 25, 1916. Serial No. 99,832.

*To all whom it may concern:*

Be it known that I, JOHN J. SHAFER, a citizen of the United States, residing at Mayville, in the county of Tuscola and State of Michigan, have invented a new and useful Speedometer, of which the following is a specification.

This invention relates to speedometers particularly designed for use in connection with cream separators, although it is to be understood that the same can be used in connection with machines of other types for the purpose of indicating the speed of rotation.

A further object is to suspend the mechanism from the revoluble element from which motion is received by said mechanism.

Another object is to adjustably connect a centrifugal governor to an indicator operating means whereby the mechanism can be set to any speed desired so that, when the predetermined speed is attained, the indicator will designate a graduation provided for that purpose.

A further object is to provide a structure of this character which is simple and compact in construction, can be readily applied to a crank arm or the like, and the working parts of which are readily accessible.

A still further object is to provide means whereby breakage due to sudden starting or stopping of the mechanism is prevented.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of the speedometer connected to the crank arm of a cream separator or the like. Fig. 2 is an enlarged top plan view of the speedometer. Fig. 3 is an enlarged section on line A—B Fig. 2. Fig. 4 is a section on line C—D Fig. 3, the base plate of the casing being removed. Fig. 5 is a section on line E—F Fig. 4. Fig. 6 is a perspective view of the tiltable rack carrying frame.

Referring to the figures by characters of reference 1 designates a revoluble shaft or other element the speed of which is to be indicated by means of the speedometer constituting the present invention, and in the present instance this shaft is adapted to be rotated by means of a crank arm 2, this being particularly true in a cream separator, which is the type of machine for which the speedometer is primarily intended. The shaft 1 has a reduced extension 3 and mounted upon this extension is a bracket 4 which is held to the crank arm 2 by means of strips or bands 5 of any suitable construction whereby when the crank is rotated, the bracket will move therewith.

Supported by and hanging from the shaft extension 3 is a frame 6 one side of which is made up of a removable bar 7 and outstanding from the sides of the frame are bosses 8 to which are secured the sections 9 and 10 of a casing or housing in which the mechanism of the speedometer is located. The shaft 3 is designed to rotate freely within the frame and as the greater portion of the frame and the casing is located below the shaft, it will be obvious that a speedometer will not rotate with the shaft but will remain with the frame 6 substantially vertical.

Extending inwardly from the upper portion of the bar 7 are superposed guide fingers 11 and 12, the finger 11 being shorter than the finger 12 and said finger 12 constituting a bearing for the lower portion of an arbor 13 to which is secured a gear 14. A pointer or index 15 is connected to the upper end of the arbor which end projects through the top of the casing 9—10 and into a dial casing 16 mounted on the top of the speedometer casing. The index 15 is adapted to move over a dial 17 arranged in the casing and which dial has preferably a circular series of graduations extending from a central zero point 18 to a diametrically opposed point indicated by a suitable mark 19. Arrows 20 may be oppositely disposed and located so as to point toward the mark 19. The index or pointer 15 is normally arranged with its point at the zero point 18.

Mounted on the shaft 3 is a gear 20 having a hub 21, this gear and its hub being fitted loosely on the shaft. Diametrically opposed bearing pins 22 are extended into the hub 21 and project into an annular groove 23 formed in the shaft. The outer portions of these pins are screw threaded as shown at 24 and project through cross heads 25, the corresponding ends of the respective cross heads being connected by springs 26 so that the pins are thus pressed constantly toward each other, thereby binding upon the inner wall of the groove 23. A spring 27 is mounted on the shaft 3 and presses against the end of the hub 21, this spring being held under compression by a collar 28 or the like carried by the shaft 3. Thus it will be seen that the pins 22 are not only caused to bind against the inner wall of the groove 23 but also press against one side wall of said groove. This frictional engagement between the pins and the shaft will be sufficient to cause gear 20 to rotate with the shaft 3 under ordinary conditions. However, should the gear 20 be subjected to excessive resistance during its rotation, shaft 3 will be permitted to rotate within the gear. Consequently danger of injury to the parts of the mechanism is materially reduced. It will be understood that by rotating the pins 22 the cross heads 25 can be adjusted toward or from each other, thus to reduce or increase the tension of the springs and correspondingly increase or reduce the pressure of the pins against the inner wall of the groove 23.

The gear 20 transmits motion through a speed multiplying train of gears 29 to a governor shaft 30 journaled in the frame 6. Secured to the shaft 30 near one end is a block 31 to which the weight carrying arms 32 of the governor are pivotally connected. Another block 33 is slidably mounted on shaft 30 and is connected to arms 32 by links 34. Block 33 has a sleeve 35 provided at one end with a collar 36 and straddling this sleeve is a yoke 37 the terminals of which are preferably provided with anti-friction rollers 38 fitting between collar 36 and block 33. Thus when block 33 and sleeve 35 are shifted along the shaft 30, the yoke 37 will be moved therewith.

Yoke 37 is carried by one arm of a bell crank lever 39 pivoted as at 40 to the frame 6. The other arm of this bell crank lever has a strip 41 pivotally connected to it. The upper end of this strip is pivotally attached, as at 42, to a strip 43 mounted upon one side of a tiltable frame 44 which is pivotally connected, as at 45, to the sides of the frame 6. This strip 43 has longitudinal slots 46 for the reception of fastening screws 47 or the like and, consequently, said strip can be shifted longitudinally, thus to move pivotal point 42 toward or from the axis of movement of the frame 44. This frame is provided at one end with an arm 48 carrying a counter balance 49. The other end of the frame has an arcuate rack 50 connected to it, this rack working between the fingers 11 and 12 and constantly meshing with the gear 14.

As has heretofore been stated, when the mechanism is at rest the indicator 15 is extended to the zero point 18 shown on Fig. 2. When shaft 3 is rotated the speedometer casing remains practically stationary, this being due to the fact that the greater portion of the weight of the speedometer is located below the shaft 3 and said shaft is designed to rotate within the speedometer. Thus as the shaft rotates the gear 20, which moves therewith under ordinary conditions, will transmit motion through the train of gears 29 to the governor shaft 30. The centrifugal governor will act in the usual manner, the weights thereof moving outwardly as the speed of rotation of shaft 30 increases and this movement causing the sleeve 35 to slide along shaft 30 and toward the block 31. Such movement of the sleeve will be transmitted through the bell crank lever 39 to the strip 41 and this strip will pull downwardly on the frame 44 and cause the frame to tilt. Consequently the rack 50 will be shifted and will rotate the gear 14, thereby moving the indicator 15 away from its normal position and toward the graduation 19. The parts can be so adjusted that when the indicator 15 reaches the graduation 19 the shaft 1 of the cream separator will be rotating at a predetermined speed. By shifting the strip 43 relative to the frame 44, the mechanism will be adjusted so that the indicator 15 will not reach the graduation 19 until some other predetermined speed has been attained. By removing the outer section 10 of the casing or housing, access may be had readily to the mechanism of the speedometer and the parts can thus be easily cleaned or repaired.

It is to be understood that the shaft 3 need not be connected directly to the shaft 1 but can be fastened securely within the bracket 4, this bracket thus serving to rotate shaft 3 in unison with the shaft 1. As a matter of fact this is the preferred construction as it is thus possible to readily attach the speedometer to a shaft or other revoluble element.

Adjustment of the speedometer for the purpose of shifting the indicator 15, can be effected by using a threaded stem 51 which is carried by frame 44 and has a weight 52 adjustably mounted on it.

What is claimed is:—

1. The combination with a revoluble shaft, of a governor, means for transmitting motion to the governor from the shaft, an indicator, and means for transmitting motion to the indicator from the governor, said means including a tiltable member, an arcuate rack movable therewith, a gear connected to the indicator and engaged by the rack, and means operated by the governor for actuating the tiltable member.

2. The combination with a revoluble shaft, of a structure bearing thereon and suspended therefrom, said shaft being revoluble independently of said structure, a centrifugal governor carried by said depending structure, means for transmitting motion to the governor from the shaft, an indicator upon said structure, and means for transmitting motion to the indicator from the governor, said means including a tiltable member, an arcuate rack movable therewith, a gear connected to the indicator and engaged by the rack, a lever actuated by the governor, and a connection between said lever and the tiltable member.

3. The combination with a revoluble shaft, of a structure bearing thereon and suspended therefrom, said shaft being revoluble independently of said structure, a centrifugal governor carried by said depending structure, means for transmitting motion to the governor from the shaft, an indicator upon said structure, and means for transmitting motion to the indicator from the governor, said means including a tiltable member, an arcuate rack movable therewith, a gear connected to the indicator and engaged by the rack, a lever actuated by the governor, and a connection between said lever and the tiltable member, said tiltable member being counterbalanced.

4. The combination with a revoluble shaft, of a structure bearing thereon and suspended therefrom, said shaft being revoluble independently of said structure, a centrifugal governor carried by said depending structure, means for transmitting motion to the governor from the shaft, an indicator upon said structure, and means for transmitting motion to the indicator from the governor, said means including a tiltable member, an arcuate rack movable therewith, a gear connected to the indicator and engaged by the rack, a lever actuated by the governor, a connection between said lever and the tiltable member, said connection being adjustable.

5. The combination with a revoluble shaft and an actuating member connected to one end portion of the shaft, of a bracket detachably secured to the actuating member, a shaft fixedly mounted in the bracket, and supported thereby in line with the first named shaft, a pendant structure carried by said fixedly mounted shaft, an indicator carried by said structure, a centrifugal governor carried by said structure, means for transmitting motion from the governor to the indicator, and means operated by the relative movement of the fixedly mounted shaft and the pendant structure for actuating the governor.

In testimony that I claim the foregoing as my own, I have hereto affixed my signature in the presence of two witnesses.

JOHN J. SHAFER.

Witnesses:
 WM. WELKE,
 HENRY WELKE.

Copies of this patent may be obtained for five cents each, by addressing the "Commissioner of Patents, Washington, D. C."